April 19, 1927.
W. W. LEACH
1,625,085
FEEDER FOR SHEET METAL OR THE LIKE
Filed Sept. 10, 1924    9 Sheets-Sheet 1
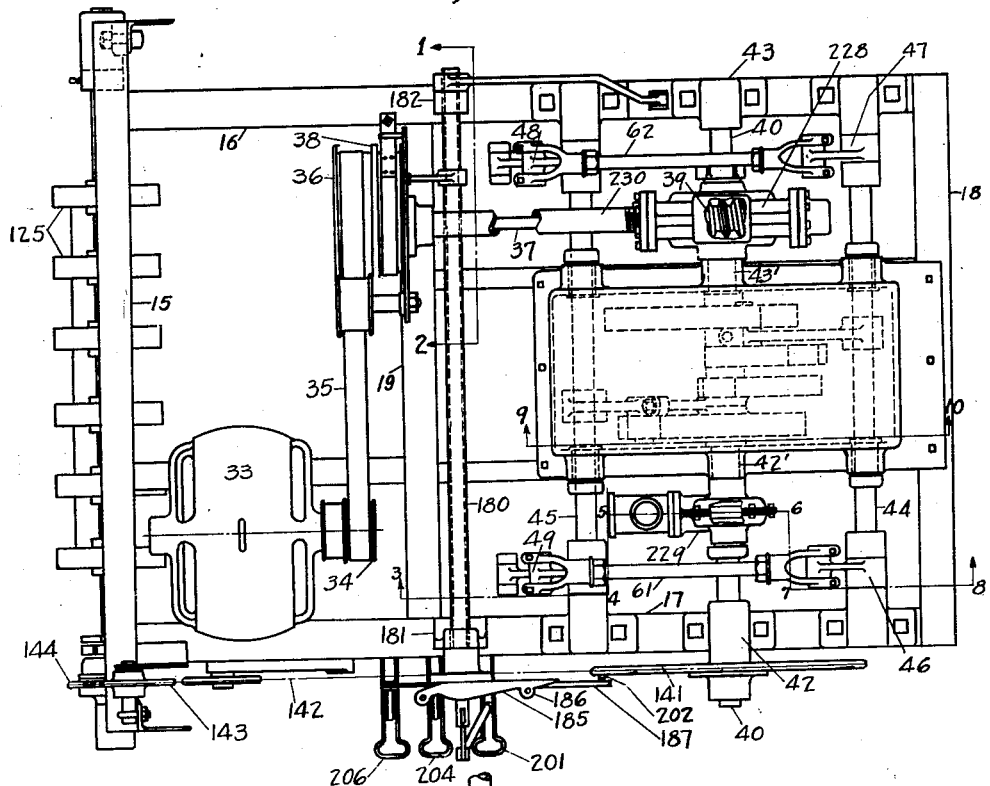

April 19, 1927. 1,625,085
W. W. LEACH
FEEDER FOR SHEET METAL OR THE LIKE
Filed Sept. 10, 1924 9 Sheets-Sheet 2

William W. Leach
John H. Boss
his Attorney

April 19, 1927.  W. W. LEACH  1,625,085
FEEDER FOR SHEET METAL OR THE LIKE
Filed Sept. 10, 1924   9 Sheets-Sheet 4

Inventor
William W. Leach
By John V. Goss
his Attorney

April 19, 1927. 1,625,085
W. W. LEACH
FEEDER FOR SHEET METAL OR THE LIKE
Filed Sept. 10, 1924   9 Sheets-Sheet 5

Inventor
William W Leach
By John X Cox
his Attorney

April 19, 1927. 1,625,085
W. W. LEACH
FEEDER FOR SHEET METAL OR THE LIKE
Filed Sept. 10, 1924    9 Sheets-Sheet 6

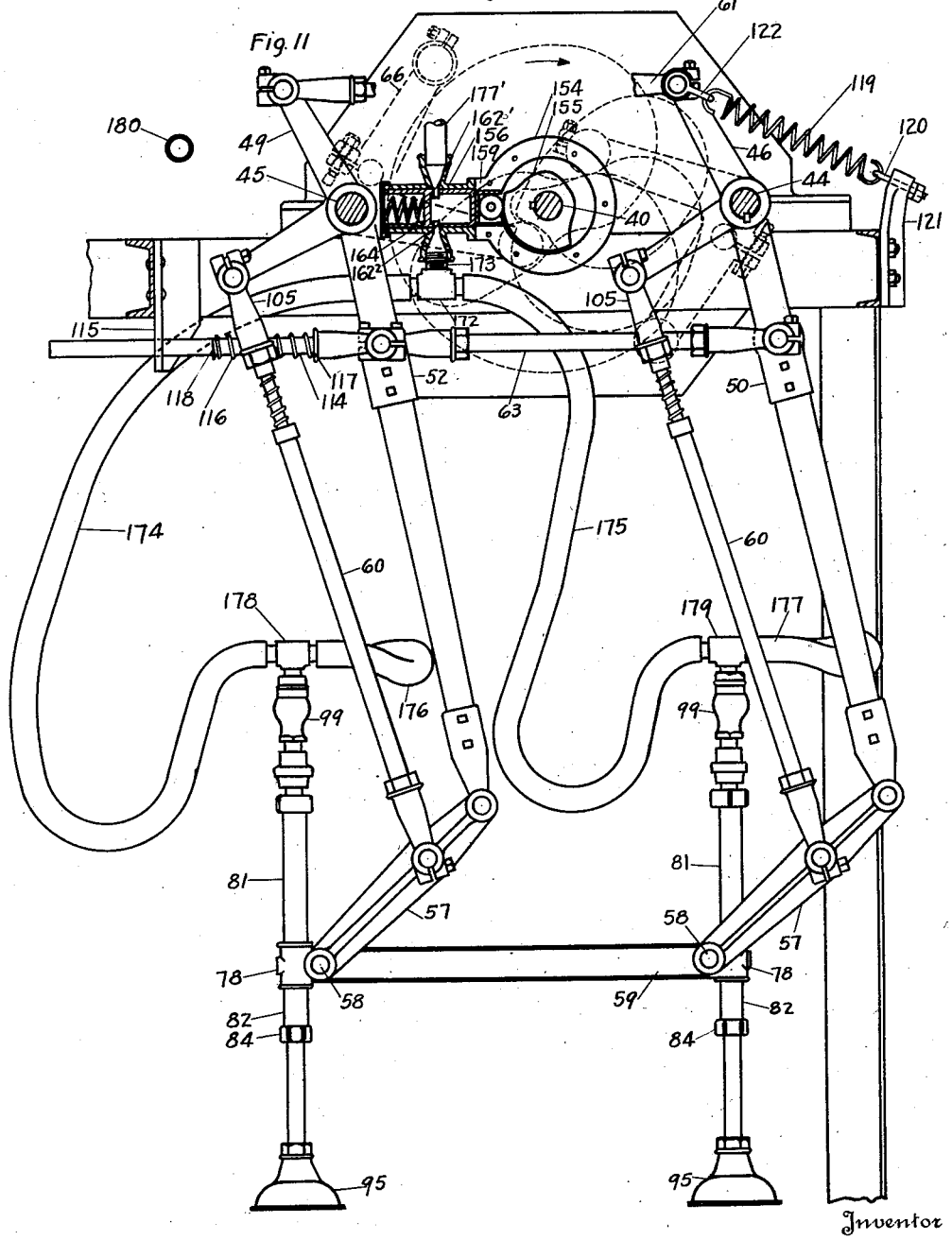

April 19, 1927.
W. W. LEACH
1,625,085
FEEDER FOR SHEET METAL OR THE LIKE
Filed Sept. 10, 1924    9 Sheets-Sheet 8
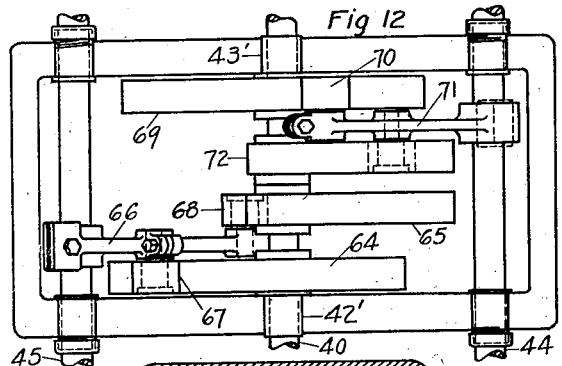
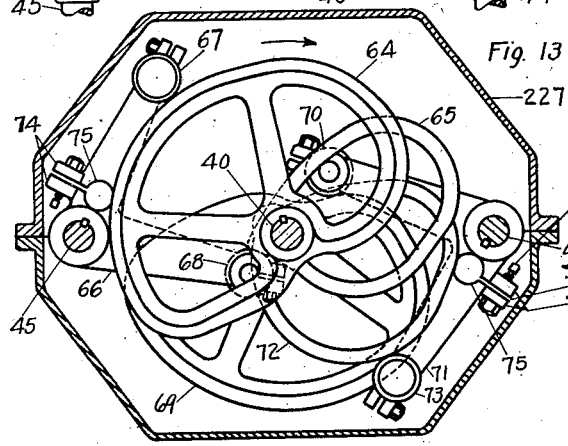
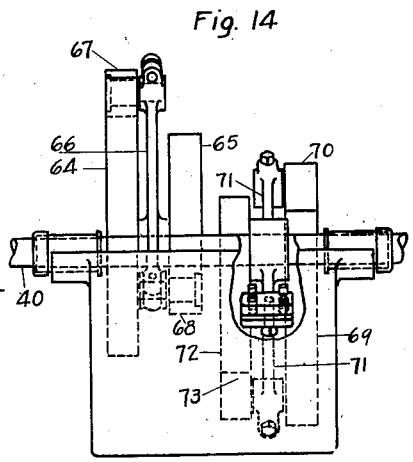
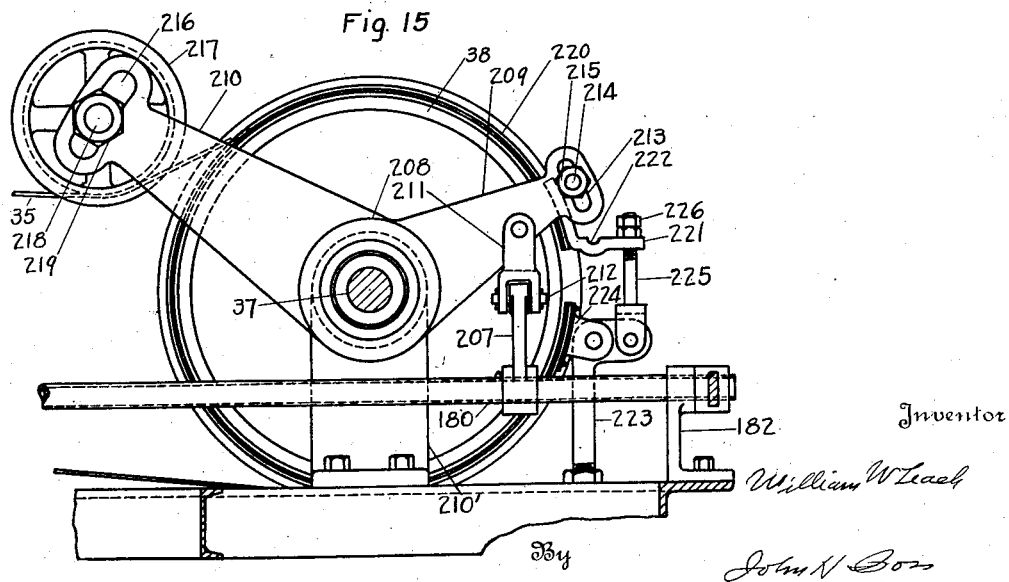

April 19, 1927.  W. W. LEACH  1,625,085
FEEDER FOR SHEET METAL OR THE LIKE
Filed Sept. 10, 1924   9 Sheets-Sheet 9
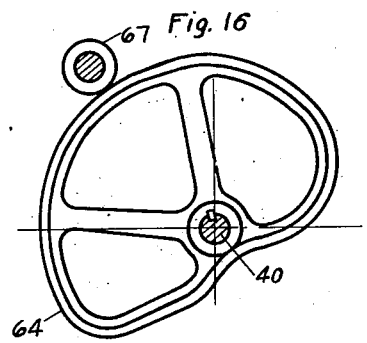
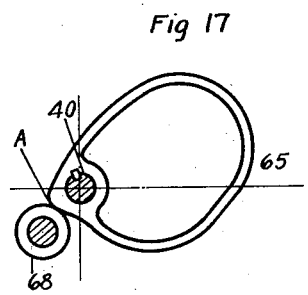
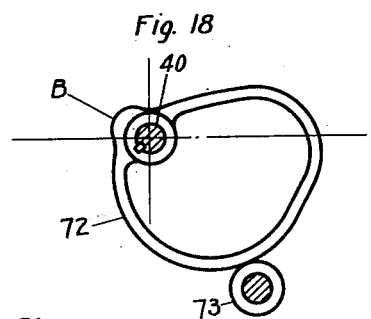
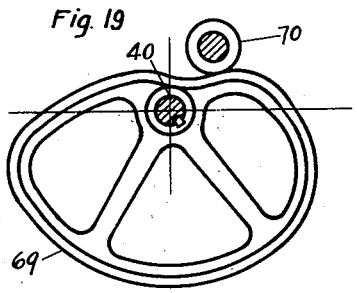
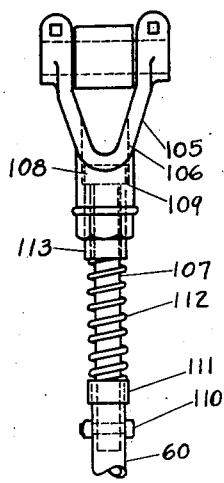
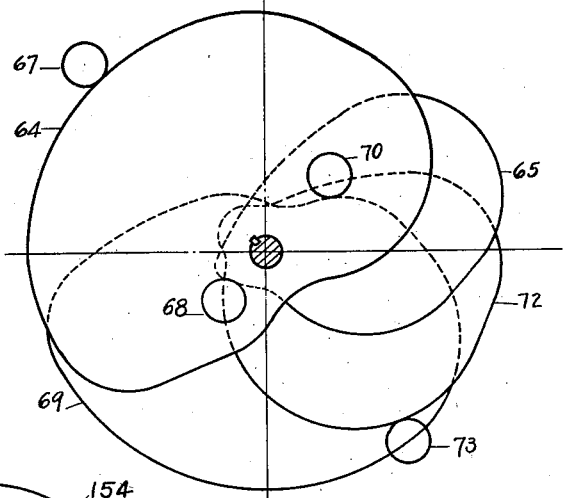
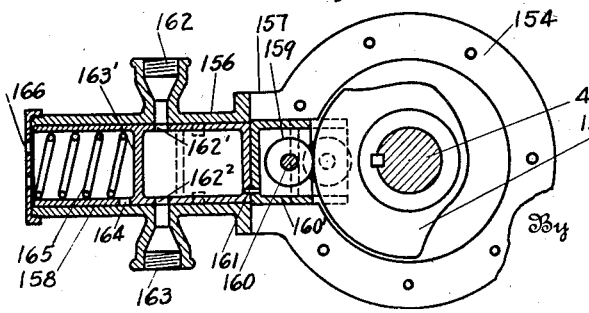
Inventor
William W Leach
By John N Goss
his Attorney Patented Apr. 19, 1927.

1,625,085

UNITED STATES PATENT OFFICE.

WILLIAM W. LEACH, OF MANSFIELD, OHIO, ASSIGNOR TO WILLIAM H. DAVEY, ALBERT I. DAVEY, SAMUEL DAVEY, JOHN DAVEY, FRANCIS A. DAVEY. AND JAMES G. DAVEY, ALL OF MANSFIELD, OHIO, AND HAROLD DAVEY, OF DETROIT, MICHIGAN.

FEEDER FOR SHEET METAL OR THE LIKE.

Application filed September 10, 1924. Serial No. 736,965.

This invention relates to a feeder adapted to feed sheets of metal or the like to other machines, or for delivering same from the feeder to a predetermined place.

The present invention is used for transferring from a pile of sheets of metal or the like, one sheet thereof at a time to a predetermined place within the range of the throw or travel of the feeding mechanism or from the feeder to another machine to be further operated on, or treated as the case may be, as for instance feeding the sheets of a pile to oiling rollers, scrubbing, polishing, or cleaning machines, cold rolling mill machines or the like or in other words to any machine that requires constant and continuous feeding of sheets of metal or the like for efficient and automatic operation on, or for the treatment of each sheet delivered for the purpose desired.

It is well known among those skilled in the art that in producing or manufacturing sheet metal, that a part of the process of producing sheet metal is to provide vats containing a bath of dilute sulphuric or nitric acid or the like to remove the burnt sand, scale, rust, etc. from the surface of the sheet metal to brighten them or improve their color. The present method of immersing a sheet or pile of sheets of metal into such bath or to remove the metal sheets therefrom is more or less accomplished by hand.

In performing this function the workman or operator covers his hands and arms with rubber gloves or the like or uses some hand manipulated tool or device, which more or less leaves part of the anatomy of the operator or workman exposed, and not being covered or protected is subject to the deleterious effects of the acid bath which exposure results in injury to the operator, which is detrimental to and injurious to the health of such operator.

The acid ofttimes seriously effects the health of the operator especially when it comes in contact with cuts, sores, abrasions or lesion on the anatomy of the workman or operator and at times literally eating or destroying the skin or other parts of the anatomy of such workman or operator, thereby detrimentally effecting the operator's health and pecuniarily damaging the operator or workman on account of making it necessary to discontinue work in order to recuperate and recover from the effects of the acid in the bath coming in contact with his anatomy to which the sheet metal is subjected to for the purpose intended.

In placing the sheet metal in or taking same from the bath, it is accompanied by more or less splashing or displacement of the acid in the bath spilling around the vat and coming in contact with the anatomy of any workman or operator that happens to be in the vicinity of the bath and exposed at the time. On account of the deleterious, noxious, hurtful, pernicious, and injurious effects on the health and comfort of the workmen in performing the process of placing in and removing the sheet metal from the bath, great difficulty is encountered in sheet rolling mills to secure efficient or competent help to perform the service of subjecting the sheets to the pickling bath or process.

The present invention is especially designed (although as stated it can be used for other purposes) for removing the difficulties encountered and injurious effects to the health and comfort of the operator or workman in placing in and removing a sheet of metal or the like from the acid pickling bath vat as hereinbefore referred to. The drawings show the application of the machine for the removal of the metal sheets (one at a time) from a pickling bath and also the application of the feeding mechanism when used for feeding a single sheet of metal at a time from a pile of sheets delivered to the feeder, to a pair of rollers located adjacent to the feeder for oiling the sheets when desired.

The primary object of this invention is to so construct and operate a mechanism or feeder that is adapted to carry a plurality of vacuum or suction cups which mechanism or feeder imparts an upward lifting movement to the vacuum or suction cups up to a predetermined point; thence in a plane horizontal rearward direction to the point of the beginning of the forward movement and thence in a downward movement to its normal position preparatory to completing another cycle of operation. These movements are adapted to lift and grip by suction one sheet at a time from a pile of metal sheets or the like through the medium of the suction or vacuum cups, and to carry the sheet forward to a predetermined point or position and then deposit the sheet at the end of its travel, or feed the sheet between a feeding roller and feed wheels to another machine to operate on the sheet or to be treated by such other machine. The feeder is also adapted to lift a single sheet at a time by suction from a pile of sheets in a pickling vat or the like without manual handling, or from a platform or truck to meet requirements.

Another object of this invention is to construct a valve mechanism and means for operating the valve mechanism that will cooperate with a vacuum tank and a vacuum producing apparatus to produce a vacuum in the cups at a predetermined time and admit air as atmospheric pressure and break the vacuum at a predetermined time.

Another object of this invention is to provide valves in the tubular standards carrying the vacuum cups that automatically close by atmospheric pressure when the suction or vacuum is broken that is produced in the vacuum cups.

Another object is to provide means for cushioning the rearward and forward throw or movement of the feeder mechanism and at the same time storing energy in the cushioning means to give impetus to the forward or rearward return movement or throw thereof, thereby obviating the vibration and strain of the parts comprising the reciprocating mechanism at the end of each stroke and adding to the efficiency of the operation of the feeder.

Another object of the invention is to provide a control mechanism for the feeder comprising a unit mechanism, which is adapted when in one position to automatically operate a brake mechanism to stop the feeder at a predetermined time and simultaneously therewith lift an idler pulley to release its pressure on the power belt of the feeder; to provide for its actuation to an "off" position to permit the feeder to start and operate continuously when desired; to permit the operation of the brake as an emergency brake to stop and to release the pressure of the idler on the power belt to stop the feeder at any point of its movement, and which also provides means to prevent the operator of the machine from attempting to insert a pile of sheets or the like in position for feeding purposes when the vacuum cups and their associated parts are at the end of their downward stroke thereby preventing damage or breakage (inadvertently) of the vacuum cups and their associated parts by pressure or contact of the pile or the like with the vacuum cup mechanism.

Other objects are to provide means for yieldingly mounting the vacuum cups of the feeder on the movable carrier frame in such a manner as to provide and compensate for the variations in the heights of different piles of sheets of metal or the like supplied to the feeder and to permit the vacuum cups to yield in the event of other unusual obstructions being encountered in the downward travel of the cups, that might cause breakage or damage to the vacuum cups and their associated parts, if said vacuum cups were rigidly mounted on the carrier frame.

Another object is to provide for lateral adjustment of the vacuum cups in either direction and for an additional safety auxiliary yielding movement of part of the supporting means of the vacuum cups.

A further object is to provide means of mounting a plurality of feeding wheels upon a shaft mounted on the feeder and driven by a friction clutch for cooperation with a feeder roller journaled in yielding bearings attached to the feeder, the rollers and friction wheels being arranged to grip the sheet (before) the vacuum is broken in the cups, thereby forcing the sheet to travel to a predetermined point from the machine, or to oil rollers or the like for further treatment or operations thereon and also to provide automatically operable means for feeding either long or short sheets from the feeder without affecting the efficiency of the feeder.

These and other objects are attained by the mechanism illustrated in the accompanying drawing, in which—

Figure 1 is a diagrammatic plan view showing the feeder and its associated mechanism assembled for cooperative actuation.

Figure 2 is a plain view on an enlarged scale of the brake operating mechanism showing the position of the control bar which is mounted to pivot horizontally to and from the master driving sprocket to permit the continuous operation of the feeder or to stop the feeder automatically at a predetermined point of the rotation of the master sprocket and a plan view of the emergency brake connection.

Figure 3 is a side view of Figure 2 on an enlarged scale of the brake operating mechanism and side view of the emergency brake connection.

Figure 4 is an end elevation of the brake operating mechanism on an enlarged scale showing the top portion of treadle bars connected to a T-shaped bar which in turn is connected to the horizontal control bar to start the feeder or stop same automatically, and treadle connection of the emergency brake mechanism.

Figure 5:
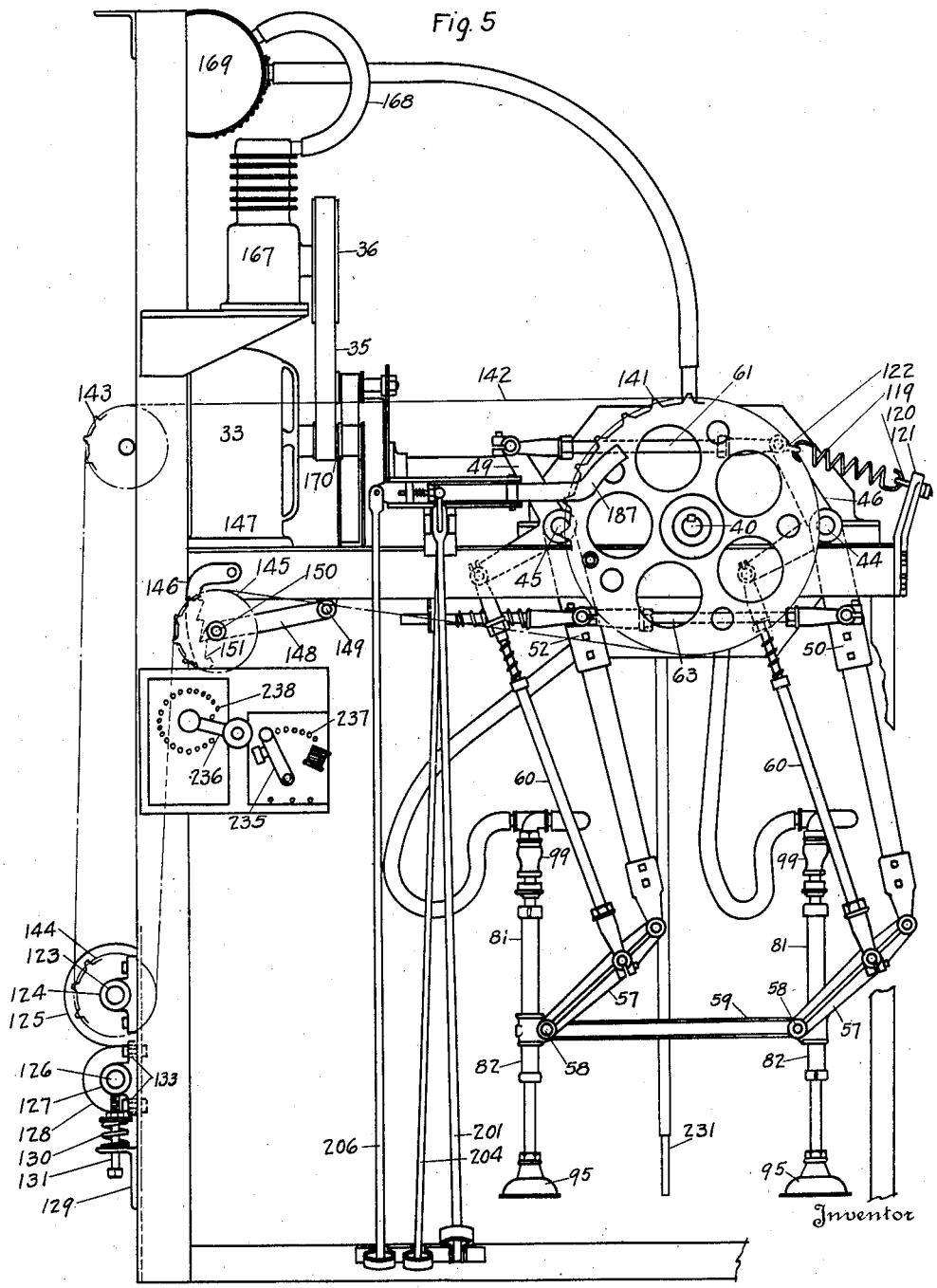

Figure 5 is a right side view of the feeder looking at the feeder from the front, showing the vacuum cups at the rear end of their stroke and about to be brought in contact with a sheet of a pile of sheets of metal or the like, and also showing a diagrammatic view of the electrical apparatus for changing the speed of the machine, the vacuum producing apparatus to be connected to the vacuum tank, and flexible tubular connections to the vacuum cups.

Figure 6:
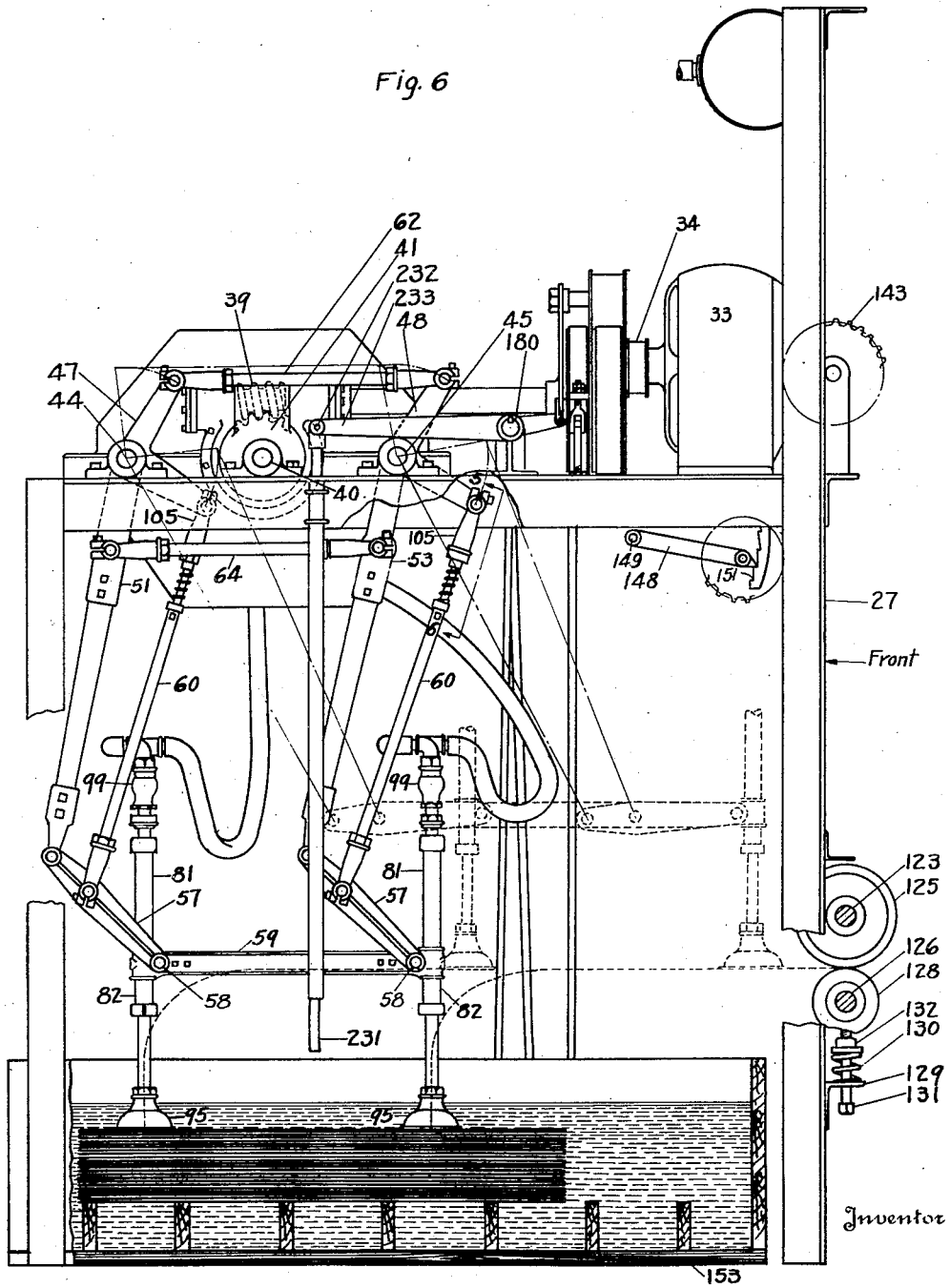

Figure 6 is a left side view looking at the feeder from the front showing the vacuum cups at the rear end of their stroke and in contact with a sheet of a pile of sheets of metal or the like (which are deposited in a pickling vat) in full lines and at the end of their stroke in dotted lines.

Figure 7:
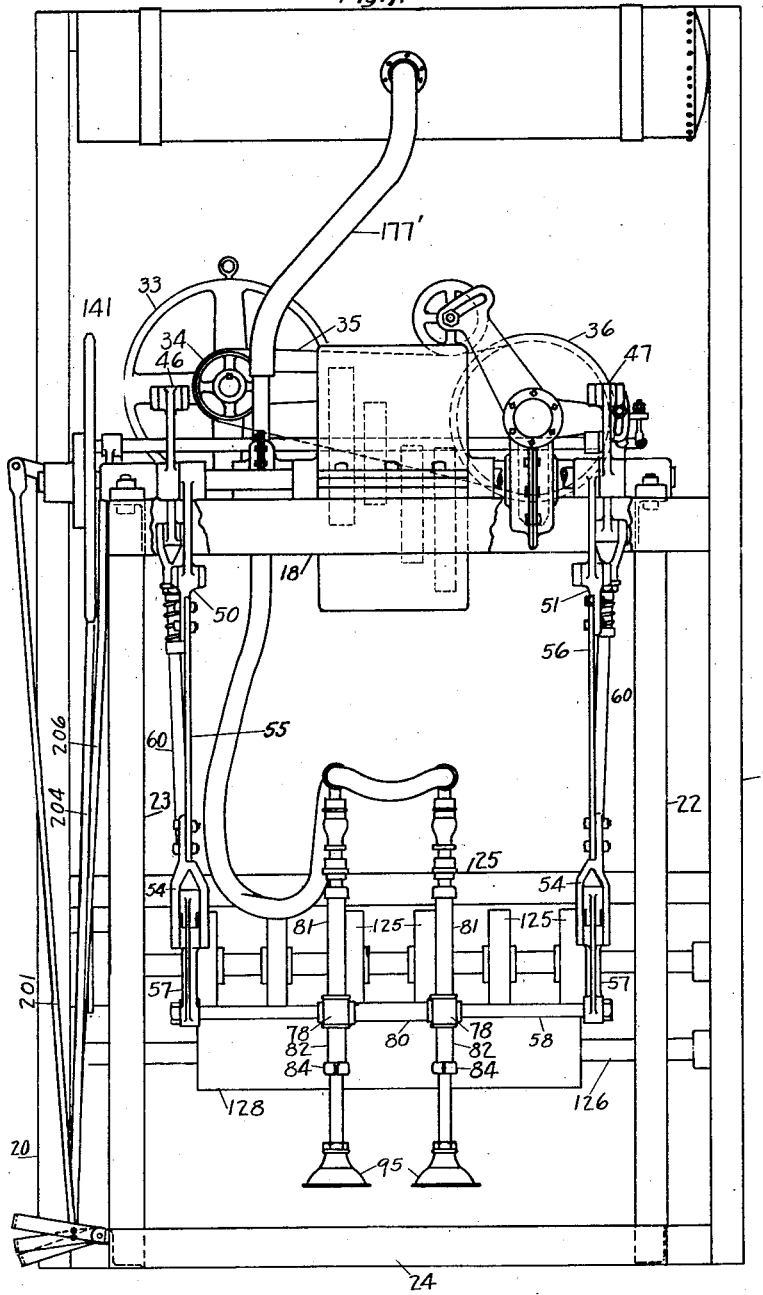

Figure 7 is a front view of the feeder and its associated mechanism.

Figure 8:
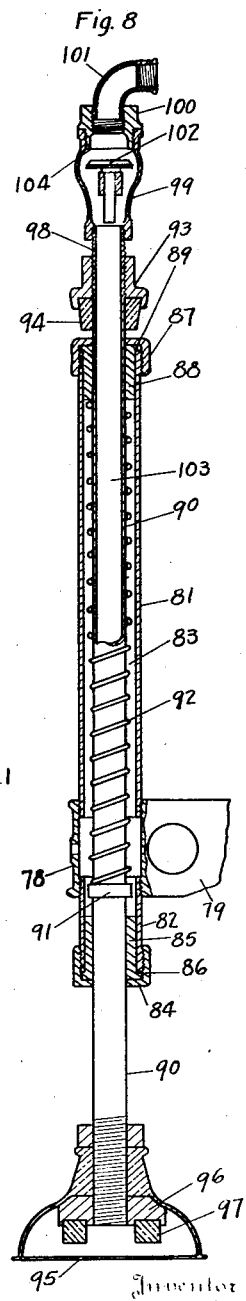

Figure 8 is a detail sectional view of one of the suction cups and its cooperating mechanism.

Figure 9:
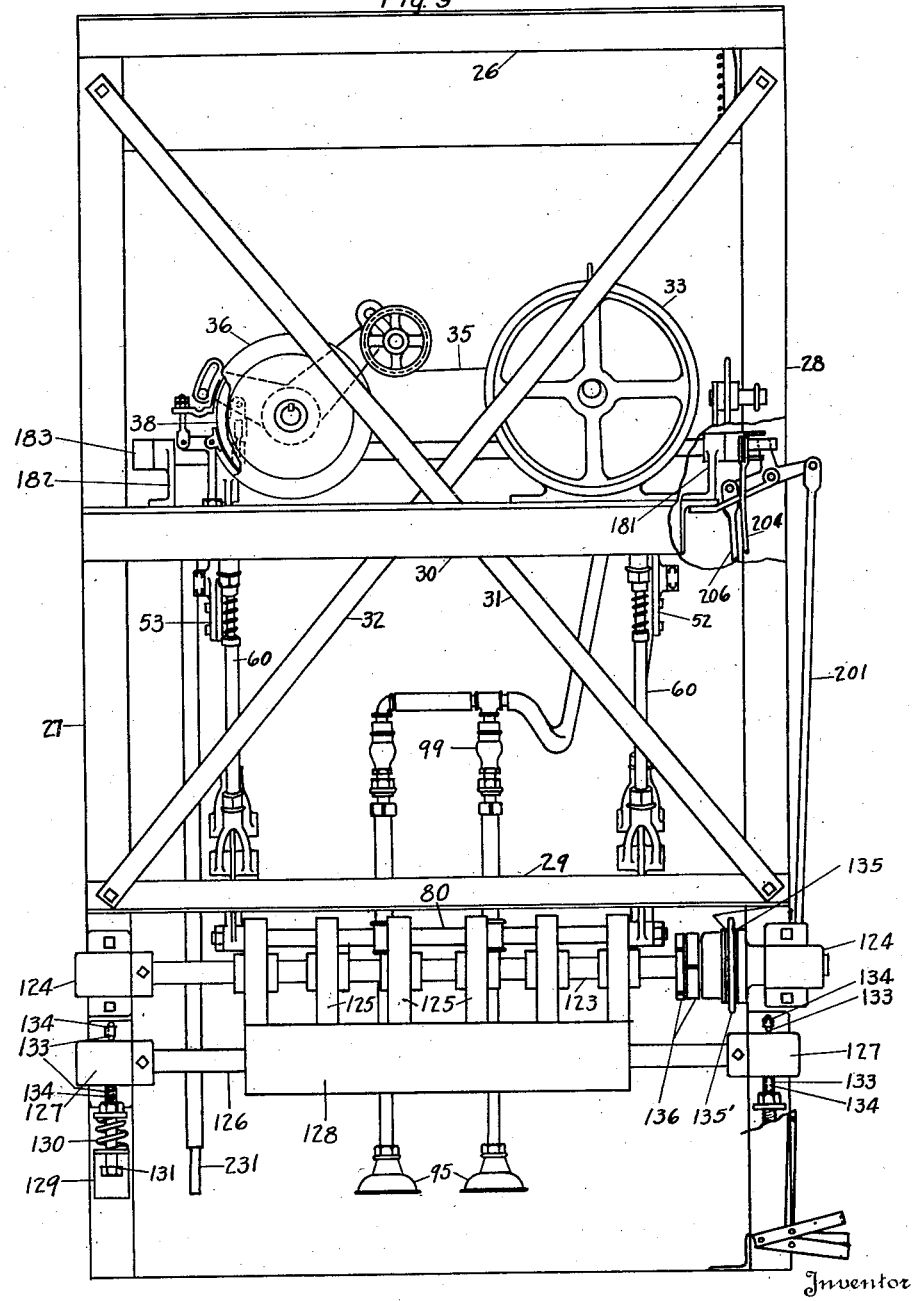

Figure 9 is a rear view of the feeder and its associated mechanism also showing a portion of the frame work broken away to more clearly show the operation of the stopping and starting mechanism.

Figure 10:
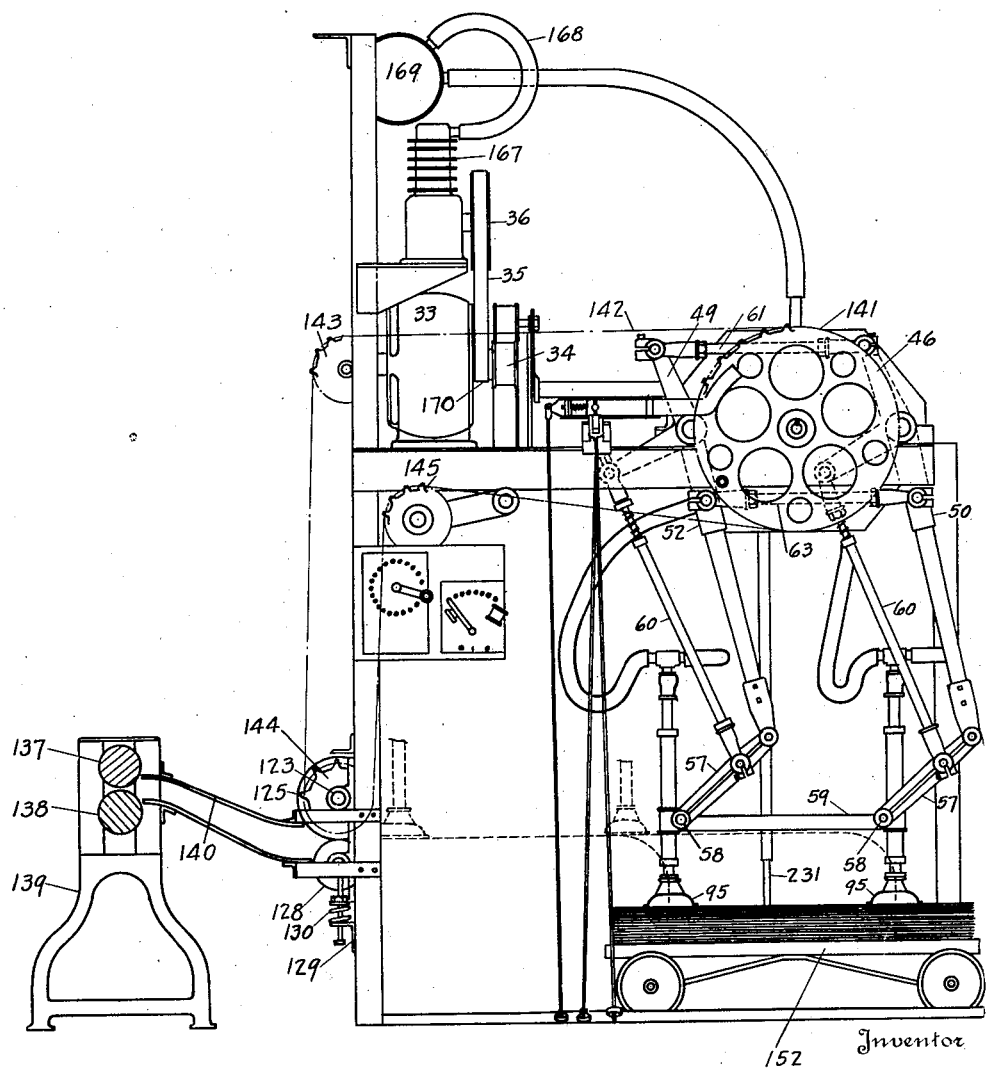

Figure 10 is a right side view of the feeder looking from the front showing the vacuum cups in full lines in contact with the top sheet of a pile of sheets mounted on a truck and the feeder cups in dotted lines at the end of their forward position or stroke carrying the sheet to a point between the feeder wheels and roller, which feed the sheet and direct same through the medium of guides to a pair of rollers to treat the sheet with oil.

Figure 11 is a right side view of the feeder on an enlarged scale looking from the front showing the vacuum valve mechanism of the feeder, the actuating means thereof, a diagrammatic view of the cam in its relation to the vacuum valve operating mechanism and the elements that operate the feeding mechanism by contact with the cams, taken on the lines 3, 4, 5, 6, 7, and 8 of Fig. 1.

Figure 12 is a plan view of the cam housing with a cover removed, showing the cams and the actuators, which operate the rock shafts through the medium of rollers, which rollers are mounted on bell cranks on opposite sides thereof to contact with their respective cams.

Figure 13 is a side elevation of Fig. 12 taken on the lines 9—10 of Fig. 1, showing the rollers which are mounted on the actuators in contact with the cams.

Figure 14 is a rear view of the cams and the actuators looking at Fig. 13 in the direction of the arrow.

Figure 15 is a side view (taken on the line 1—2 of Fig. 1) on an enlarged scale showing the means for imparting movement to the feeder by an idler which tightens a belt driven from motor and simultaneously therewith releases the brake mechanism and when it is desired to stop the feeder releases the idler pulley from contact with the belt and simultaneously therewith actuates the brake mechanism to stop the feeder.

Figures 16, 17, 18, and 19 are side elevations of the cams showing the rollers carried by the bell cranks in contact therewith at predetermined points.

Figure 20 is a diagrammatic side view showing the cams mounted on a driven shaft in their respective relations to each other and which are arranged to impart the required movement to the feeding mechanism, through the medium of the rollers carried by the actuators which are mounted on rock shafts and actuated by the cams.

Figure 21 is a detailed view (taken on the line 6—6 of Fig. 6) of part of one oscillating lifting link rod showing the method of yieldingly connecting the two parts of the oscillating lifting rod.

Figure 22 is a side sectional elevation of the vacuum valve showing the valve open to the vacuum cups in full lines and the closed position of the valve in dotted lines when the vacuum in the cups is cut off allowing atmospheric air to break the vacuum therein.

In the drawings accompanying this specification and filed herewith, the invention is shown for use and operation as a preferred embodiment thereof, to remove and feed sheets of metal or the like from a pickling vat and deliver and deposit same at a predetermined place, such as is ordinarily used in sheet mills for pickling sheets of metal, as part of the process of manufacturing same for commercial use.

Referring to the drawings reference numerals 15, 16, 17, 18, and 19 indicate the major parts of the top of the frame upon which the mechanism hereinafter described is mounted and reference numerals 20, 21, 22, 23, 24, and 25 represent the major front portion of parts of the frame, and 26, 27, 28, 29, 30, 31, and 32 the major portions of the rear part of the frame. Other portions of the frame not herein specifically indicated are merely conventional and adapted to support parts of the mechanism in auxiliary capacities.

*Application of power.*

Power is preferably derived for the operation of the feeder by a motor 33, which is provided with a sheave pulley 34. Power is transmitted from the sheave pulley 34 of the motor by the belt 35 to a sheave pulley 36, which is mounted upon a shaft 37 and imparts movement thereto. A brake pulley 38 is preferably made integral with the sheave pulley 36 and revolves therewith. A worm 39 is rigidly mounted upon the shaft 37 and inclosed within a casing which will be indicated hereinafter. Spaced apart and on a lower plane from the shaft 37 a cam shaft 40 is mounted carrying a worm gear 41, which through the medium of the worm imparts rotary movement to the cam shaft.

The cam shaft is journaled in boxes 42 and 43, which are mounted on the frame and journal boxes 42' and 43' made integral with the housing.

The feeding mechanism.

The conventional construction of the feeding mechanism as shown in its present application is as follows:

Rock shafts 44 and 45 are preferably mounted and journaled on the frame and in the cam housing on a plane with the cam shaft 40 and in spaced and in parallel relation thereto, as shown in Figs. 6 and 11. Bell cranks 46 and 47 are rigidly mounted and secured to the rock shaft 44 by keys in spaced apart side relation to each other and similar bell cranks 48 and 49 are loosely mounted on and secured in alignment with the bell cranks 46 and 47 on the rock shaft 45.

Swinging supporting arms 50 and 51 are loosely journaled on the rock shaft 44 and similar swinging supporting arms 52 and 53 are rigidly secured by a key or the like to the rock shaft 45. The free ends of the swinging arms are bifurcated as shown at 54 in Fig. 7 and are connected together by connecting bars 55 and 56. Lever links 57 are pivotally connected to the bifurcated ends of the swinging arms at one end and their opposite ends are pivotally connected to the end rods 58 which pass through the side frame bars 59, thereby supporting the frame of the feeding mechanism and imparting a reciprocating movement to the frame when movement is imparted to the swinging supporting arms.

To actuate the frame as desired when it is functioning for feeding purposes, means are employed to raise or lift the frame first in a vertical direction; thence in a slight radial direction to the highest point of its vertical movement, and thence to the end of its movement on a horizontal plane.

This movement is accomplished by auxiliary mechanism which is associated with the reciprocating means and is constructed and assembled as follows:

Link lifting rods 60 are pivotally connected to lever links 57 in a predetermined spaced relation from one end and their opposite ends are pivotally connected to the bell cranks hereinbefore described.

Attention is called to the fact that the swinging supporting arms 50, 51, 52, and 53 are offset to permit alignment of the same with the lifting rods 60 to align the ends thereof, to permit connection to lever links 57.

In order to transmit similar and simultaneous movement from the bell crank 49, which is loosely mounted on the rock shaft 45, to the bell crank 46 which is rigidly secured on the rock shaft 44, a link 61 is provided to pivotally connect the bell crank 49 to the bell crank 46, which are aligned on the rock shafts with each other.

A similar link 62 connects the bell crank 47 to the bell crank 48 for the same purpose and in the same manner. The swinging supporting arm 52 which is rigidly keyed to the rock shaft 45 is connected to the swinging supporting arm 50 which is loosely mounted on the rock shaft 44 by a link 63 to transmit similar movement to the swinging arm 50 from the swinging arm 52.

Means for operating the feeding mechanism.

In order to impart the desired movements to the feeding mechanism just described a plurality of cams are preferably employed and mounted on and rigidly secured to the cam shaft 40. They are grouped or arranged thereon as shown in Figs. 12 to 14 inclusive and Fig. 20 and shown in detail in Figs. 16 to 19 inclusive.

The cam 64 is formed and arranged to impart through associated mechanism a forward movement or stroke to the feeding mechanism and the cam 65 through the same associated mechanism, is arranged and adapted to impart a rearward movement or stroke to the feeding mechanism through the medium of an actuator 66. The associated mechanism that is actuated by the cams comprise an actuator 66 (which is preferably made in the form of a bell crank) and is rigidly secured to the rock shaft 45. The actuator 66 as shown in Figs. 12, 13, and 14 is interposed between the cams 64 and 65 and carries a roller 67 at one end of the crank, which is adapted to contact and ride upon the face of the cam 64. The opposite end of the crank carries a roller 68, which is secured to the crank in offset relation to the roller 67 and is adapted to contact with and ride upon the face of the cam 65, said actuator, cams, and associated mechanism thereby imparting a reciprocating movement to the movable frame of the feeding mechanism.

A cam 69 is mounted and rigidly secured to the cam shaft 40 and is formed and shaped to lift or raise the feeding mechanism when the roller 70 carried by the actuator 71, which is keyed to the rock shaft 44 is brought in contact with the cam 69. The cam 72 is shaped and formed so that it will lower the feeding mechanism when the roller 73 which is carried by the actuator 71 is brought in contact with the face of the cam 72. The actuator 71 is also preferably made of the form and shape of a bell crank with the rollers secured to each free end of the bell crank in off-set relation to each other. In other words cams 64 and 65 through the medium of the actuator 66 and its associated mechanism imparts a reciprocating movement to the feeding mechanism and frame thereof, while simultaneously therewith the cams 69 and 72 through the actuator 71 and its associated mechanism raises and lowers the frame of the feeding mechanism. To provide for adjustment of the rollers which are carried by the actuator with relation to their travel on the face of the cams, ears 74 are formed on the actuators and apertures 75 are provided therein which are intersected by slots 76 to provide means of spreading the diverging arms of the bell cranks to and from each other by screw threaded bolts 77. This method of constructing the actuator provides for adjustment of the rollers with respect to each other and their contact with the face of the respective cams upon which they travel. The effect of the plurality of cams which operate the feeding mechanism as described is first to partially raise in a vertical direction the feeding mechanism, thence imparting a slight radial movement to the frame of the feeding mechanism and thence after the feeding mechanism has reached the highest point of its vertical movement forcing the feeding mechanism directly to the end of its stroke on a plane, for delivering a sheet of metal or the like and thence returning the feeding mechanism to its original rearward position and repeating this operation until all of the sheets are fed from a pickling vat or the like to a predetermined position or auxiliary machine.

While the swinging supporting arms are imparting a reciprocating movement to the movable frame (which if attached directly to said frame, it would cause the movable frame to move in a partial radius,) the lifting arm moving at the same time in unison with the swinging arm automatically raises the movable frame and causes it to move and maintain the movable frame on a plane to the end of its stroke. In other words as the feeding mechanism is reciprocated through the medium of the swinging supporting arms, the lifting arms are actuated simultaneously to lift the frame and maintain it on a plane in its forward and rearward movement, the lifting movement of the lifting rod compensating the radial movement of the swinging supporting arms to automatically maintain the movement of the frame on a plane during its horizontal forward and rearward stroke.

*Cam races and travel of rollers.*

Attention is called to Figs. 16 to 20 inclusive and especially Figure 20 thereof, showing the path of travel of the rollers in their contact with the surfaces or races of their respective associated cams which impart movement to the feeding mechanism hereinbefore described. When roller 67 is at the low point of cam 64 the vacuum cups are at the end of their forward stroke or movement, and when roller 68 is at the low point of cam 65 the vacuum cups are at the end of their rearward stroke or movement. When roller 70 is at the low point of cam 69 the vacuum cups are at the lowest point of movement and when the roller 73 is at the lowest point on cam 72 the vacuum cups are at the highest point of their movement.

When roller 68 is travelling over the riser A of cam 65 the swinging supporting arms 52 are forced to travel backward and forward causing the vacuum cups to move up and down vertically, thereby maintaining the vacuum cups in a vertical position until they reach a predetermined position in their vertical movement which is just prior to the beginning of their radial movement.

When the roller 73 is travelling over riser B of cam 72, actuator 71 rocks shaft 44 causing the bell crank 46 to impart movements to link 60 moving lever links 57 downward on the forward movement of the vacuum cups and upward on the backward movement of the vacuum cups in each case just prior to the beginning of the radial movement of the cups.

*Movement of the vacuum cup frame.*

The movement imparted to the frame of the feeding mechanism is indicated in Fig. 6 showing the suction cups in full lines at the end of their rearward stroke (the normal position of the frame of the feeding mechanism) in contact with a pile of sheets of metal immersed in a pickling vat or liquid bath in full lines. The travel of the suction cups are shown at the end of their forward stroke or movement in dotted lines delivering a sheet of metal between a friction feed roller and friction wheels, conveying the sheet from the feeder.

*The construction of the suction cups and their associated mechanism.*

One or more suction cups and associated mechanism is mounted on and carried by the frame 59 of the feeding mechanism. All of the suction cups are identical in construction, therefore the function, operation, and means of mounting one suction cup and its associated mechanism on the frame will only be described and its connection to a companion suction cup, which is the preferable assembly of the parts for the purpose intended.

Cross fittings 78 having flanges 79 provided thereon are slidably mounted on the end rods 58 to provide for lateral adjustment in either direction. The flanges 79 extend from the cross fittings that are mounted on the bars 58 in opposed relation to each other and are connected together by the side frame bars 59. In the drawings four suction cups are shown mounted on the frame of the feeding mechanism, two on the rear rod 58 and two on the front rod 58. The four suction cups are connected together by side frame bars 59 and pipes 80 are threadably connected to the cross fittings 78 thereby connecting all four of the suction cups and their associated mechanisms together for movement in unison and providing means for lateral adjustment in either direction of the cups. It will be understood that one or a plurality of suction cups and associated mechanisms can be mounted on the frame of the feeding mechanism and used to attain the objects herein set forth and will operate with more or less efficiency according to the material that is being fed by the feeder. The use of one or more to meet the requirements depends upon the kind, character, shape, form or weight of the material that it is desired or required to feed.

*Construction of one suction cup and associated mechanism.*

A pipe or hollow member 81 is threadably connected to the cross fitting 78 extending upwardly in a vertical direction. A smaller pipe 82 is connected to the cross fitting 78 and extends downwardly in a vertical direction and in line with the pipe 81, forming a chamber 83. The pipe 82 is exteriorly screw threaded to receive the cap 84 which secures a plug 85 to the interior of the pipe 82 by pressing against the shouldered portion 86. The upper end of the pipe 81 is exteriorly screw threaded to receive a screw threaded cap 87 which securely secures a plug 88 within the interior of the pipe 81 by pressing against the shouldered portion 89 of the plug 88. A tubular vacuum cup holder 90 of considerable less diameter than the pipe 81 is coaxially arranged within the tube 81 passing through suitable apertures in the caps 87 and 84. The lower end thereof is screw threaded and extends beyond the cap 84 and the upper end thereof is screw threaded and extends beyond the cap 87. A collar 91 is securely fastened to the holder 90 and a compressible coiled spring 92 is fitted around the holder 90 abutting against the plug 88 exerting a tension against the collar 91 and the plug 88.

A nut 93 carrying a stop or supporting ring 94 is threadably connected to the upper end of the holder 90 and is adapted to contact with the cap 87 and is yieldingly supported thereon, thereby supporting and maintaining the holder 90 in normal position. To the lower screw threaded end of the holder 90, a suction cup 95 is threadably connected and is formed hollow and of yielding material such as rubber or the like. A nut 96 is also threadably connected to the lower threaded end of the holder 90, which extends into the hollow portion of the cup 95 and carries a yielding or cushion member 97 which is adapted to resist excessive pressure upon the suction cup to prevent mutilation or distortion of the cup and provide a comparatively non-yielding abutment to compress the spring 90 and permit the holder to yield when subjected to excessive or undue pressure for any reason.

A nipple 98 is threadably connected to the nut 93 and its free upper end is threadably connected to a valve casing 99. The upper portion of the valve casing is threadably connected to a nut 100 which in turn is connected to an elbow 101 leading to the vacuum valve. The valve 102 normally remains in open position while a vacuum is being produced or created within the chamber 103 of the valve holder 90. When the vacuum in the chamber 103 is destroyed or broken, air at atmospheric pressure enters the chamber 103 and the valve 99 is automatically moved to its seat 104, and thereby prevents water or other liquid from being forced up through the chamber 103 to the valve mechanism by the air pressure..

It is not necessary to use the valve 102 in the practical operation of the feeder when the feeder mechanism is being used to feed sheets of metal that are not immersed in water or other liquid bath, but it is quite essential to the practical operation of the feeder, when the metal sheets of steel are immersed in liquid bath containing acid or the like for pickling purposes to prevent water from being forced up through the chamber 103 by atmospheric pressure when the vacuum is broken.

*The yielding means for the suction cups and the frame of the feeding mechanism.*

While the feeding mechanism (or movable frame carrying the suction cups) will operate satisfactory without providing yielding means therefor, yet it has been found that it will operate with more efficiency by providing means that will permit the suction cups to yield more or less when they are brought in contact with a pile of sheets or the like by the feeding mechanism. Each suction cup 95 therefore is secured to a holder 90 which is yieldingly held in its normal position by the compression spring 92 which is mounted between the collar 91 and the plug 88 as hereinbefore described. When the bottom surface of the cup 95 is brought in contact with a pile of sheets the cup yields until the sheets are brought in contact with the cushion ring 97 and further pressure is relieved by compressing the spring 92. The construction hereinbefore described of mounting the holder means of the suction cups on the frame of the feeding mechanism permits the cup to automatically adjust itself and is brought in contact under yielding pressure with a pile of sheets of metal of different heights or sizes and further provides means of permitting the cups to yield, if by inadvertence or accident any obstruction is interposed in the path or travel of the cups and also provides means for permitting the cups to automatically yield to meet the requirements without breakage of the parts in the event of an obstruction or pile of sheets of excessive height being interposed between the suction cups and pile of sheets.

Automatic yielding means.

The yielding means provided on the holder of the suction cup means is sufficient for ordinary purposes. To provide further yielding means for emergency purposes as shown in the drawings the lifting rods 60 are preferably made in two parts and constructed as follows (see Fig. 21):

The bifurcated portion 105 of each lifting rod is provided with an aperture 106 into which a bolt 107 is inserted provided with a head 108. The head rests upon a shouldered portion 109 of the bifurcated portion and its body portion extends beyond the bifurcated portion is attached to the other part of the lifting rod 60 by a bolt 110. A collar 111 is fitted to the portion of the bolt 107 and a compressed coiled spring 112 abuts against the face of the collar 111 and the bottom face of the bifurcated portion 113 under tension, thereby maintaining the two parts of the lifting rod 60 in normal position. It will be observed that when the yielding movement of the spring 92 on the holder means of the vacuum cup is exhausted and further yielding movement is required to prevent breakage of the parts on account of further pressure of the vacuum cups on the pile of metal sheets or the like, then and in that event further yielding movement of the vacuum cups is accomplished or permitted through the medium of the spring 112 which permits the lower part of the lifting rod 60 to compress said spring 112 and provide for further emergency yielding movement in addition to the yielding movement provided for in the holder means of the suction cups.

Means for cushioning the impact of the feeding mechanism at one end of its travel for storing energy to give impetus to the return stroke of the feeding mechanism.

In order to cushion the impact of the feeding mechanism after it reaches the end of its stroke, yielding means are provided. The means provided for cushioning the feeding mechanism at or adjacent to the end of its forward stroke consists of rods 114 which are pivotally attached to the swinging supporting arms 52 at one end and their opposite ends are slidably supported upon the bracket 115. Springs 116 are interposed between the shoulder 117 and brackets 115 and as the swinging arms move forward the springs 116 contact with the brackets 115 and cushion the forward stroke of the feeding mechanism by compressing the springs 116 against the brackets 115 storing up energy to give impetus to the supporting arms to commence their return or rearward stroke to normal position.

It will be noted that there is a space between the brackets and the ends 118 of the springs to permit travel of the springs for a short distance before they contact with the brackets 115 for compression.

Counterbalance mechanism.

Expansible springs 119 are provided to exert a tension at the opposite end of the stroke of the feeding mechanism and arranged as follows:

The coiled springs 119 are secured at one end to eye bolts 120 which are adjustably secured to brackets 121. The opposite ends of the coiled springs 119 are secured to the bell cranks 46 by links 122 thereby giving impetus to the feeding mechanism and counter-balancing the feeding mechanism.

Means associated and combined with the feeding mechanism of the feeder to deliver sheets of various sizes to auxiliary machines without affecting its efficiency or continuous operation.

In order to convey and transfer the sheets of metal after being received from the feeding mechanism to the outside of the machine or to another machine for further operation a shaft 123 is mounted on the frame of the feeder and is journaled in boxes 124. A plurality of friction feed wheels 125 are rigidly mounted upon the shaft in spaced relation to each other. A shaft 126 is journaled on the frame in boxes 127 and located in parallel relation below the shaft 123 and carries a friction feed roller 128 which is adapted and arranged to be held in frictional yielding contact with the feed wheels 125. The boxes 127 to permit the roller 128 to yield are supported upon yielding bearings which comprise brackets 129 having compressed springs 130 mounted thereon.

Bolts 121 having their ends threaded are inserted in suitable apertures in the brackets 129 and they are provided with nuts and washers 132 which maintains the springs 130 under tension.

Slots 133 are formed in the bearing boxes 127 to permit adjustment of the boxes. The boxes are held in place by bolts 134. The upper portions of the bolts 131 support the boxes 127 permitting the boxes to yield or move when subjected to the pressure that is exerted thereon, when a sheet of metal or the like is being fed between the friction wheels and friction feed roller.

A friction clutch 135 comprising two disks are frictionally held against a sprocket wheel 135' that drive the friction feed wheels with fiber washers interposed therebetween. The washers are mounted upon the shaft 123 to provide frictional means of driving the shaft 123. Means for adjusting the friction clutch are provided which comprise lock nuts 136. The clutch is for the purpose of permitting the friction wheels 125 to slip or to be retarded in their rotary movement to correspond with other feeding rollers or the like or other auxiliary machines such as shown in Fig. 10 comprising oil rollers 137 and 138, mounted on a suitable frame 139 and which are adapted to receive the sheets as they are fed from the frictional wheels and roller of the feeder through the guide 140.

*Means for transmitting power to the feeder.*

Movement is imparted to the delivery mechanism described by transmitting the power from the cam shaft 40 as follows:

A master sprocket wheel 141 is rigidly keyed to the cam shaft 40. A sprocket chain 142 engages the sprockets on the wheel 143 passing around a friction sprocket wheel 144; thence to an idler sprocket wheel 145, which drives the shaft 123 carrying the friction feed wheels 125. A notched segment 146 is pivotally mounted on a pin 147 which is secured to the frame of the feeder. A combined pawl and sprocket support 148 is pivoted at one end on a pin 149 and also supports and journals adjacent to the opposite free end thereof, the idler sprocket wheel 145 on a pin 150 and its end is adapted to engage the notches 151. The idler sprocket 145 is used for the purpose of tightening or loosening the sprocket chain 142. To accomplish this object the notched segment is swung on its pivot and held in place to tighten or loosen the chain 142 in its travel around the sprockets by manipulating the pawl 148 to engage the notches 151.

Reference numeral 152 indicates a truck upon which a pile of sheets are mounted, but not immersed in water or other liquid. Reference numeral 153 indicates a pickling vat or bath showing a pile of metal sheets or the like immersed in water, acid, or other liquid for pickling purposes.

*Valve and its operating mechanism to provide means of producing and breaking the vacuum in the suction cups at a predetermined time.*

A cam casing 154 is mounted on the cam shaft 40 in any well known manner. The casing incloses a cam 155, which is rigidly secured to the cam shaft 40 and is adapted to operate the sliding vacuum valve. A valve casing 156 is secured to a hub 157 of the cam casing 154. A valve 158 is fitted to the casing and adapted to slide to and fro within the valve casing as shown in full and dotted lines in Figs. 22 and 11, when actuated by the cam 155 as the high point or low point of the cam face contacts with the roller 159. The roller is mounted on a pin 160 which is journaled in the cage 160' and is connected to the valve and kept in alignment therewith by a dowel pin 161. When the valve is in the position shown in Figure 22 in full lines the inlet 162 to the valve is aligned with the aperture 162' and $162^2$ formed in the valve in alignment with each other and in alignment with the outlet 163 and atmospheric air is prevented from passing through the apertures 164 to the outlet 163 by a partition 163'. The valve is then in position to produce or create a vacuum in the vacuum cups through the medium of any type of vacuum producing apparatus. When the aperture 164 formed in the sliding valve is moved to a position in alignment with the outlet 163 by the spring 165 the valve is then in the dotted line position as shown in Fig. 22, the aperture 164 is then aligned with the outlet opening 163 permitting air at atmospheric pressure to pass into the valve through the apertures 166 to the suction cups breaking the vacuum in the suction cup or cups.

*Means of producing or creating a vacuum in the suction cups.*

To create or produce a vacuum in the suction cups, a vacuum producing apparatus 167 is provided and connected by a pipe 168 or the like to a vacuum tank 169. Movement is transmitted to the vacuum producing apparatus 167 by a belt 35 which travels on a sheave pulley 170 mounted on a motor shaft, to a sheave pulley 36 receiving power from the motor 171 or the like. The vacuum producing apparatus is connected to communicate with the vacuum suction cups as follows:

A T-shaped fitting 172 is connected to the outlet opening of the vacuum valve by a nipple 173 (see Fig. 11). Yielding connections consisting of rubber hose or the like 174, 175, 176, 177, and 177' connect the vacuum cups to the vacuum producing apparatus through the medium of T-shaped fittings 178 and 179 which in turn connects and communicates with the inlets 101 of the suction cups through the interior chamber 103 of the holder or holders 90. The cam operating the valve mechanism is timed so that at a predetermined movement of the feeding mechanism it permits a vacuum to be produced or created in the suction cups and also provides means to break the vacuum in the suction cups at a predetermined time.

*Stopping and starting mechanism.*

Referring now more specifically to Figs. 2, 3, 4, and 15 which show the automatic stopping mechanism and the manually operated stopping and starting mechanism. Reference numeral 180 indicates a brake shaft which is journaled in supporting brackets 181 and 182 upon the frame of the machine. A flange 184 is rigidly secured to the brake shaft 180 and a bracket 185 is rigidly secured to the flange by any well known means. The bracket is provided with ears 186 and a lever 187 is pivoted to swing between the ears upon a pin 188. This permits the pivoted lever to swing to and from the position shown in full and dotted lines in Fig. 2. The pivoted lever 187 is provided on one end with ears 189 to receive the head 190 of a bolt 190'. The head of the bolt 190 is connected to the ears by a pin $190^2$. The bolt adjacent to its end 191 is slidably fitted to an aperture formed in a pivoted pin 192 which is fitted to the ears 193 and 194 of the bracket 185. A coiled spring 195 under tension is interposed between the head 190 of the pin and its casing 192'. The coiled spring exerts its tension to hold the pivotal lever 187 in the dotted line or full lines position as shown in Fig. 2. The dotted line position of the pivotal lever 187 being in position to stop the mechanism and the position of the pivotal lever shown in full lines is the position to permit the feeder to be continuously operated. The coil spring exerts a tension against the ears 189 forcing the pivotal lever 187 to off-position when forced beyond the center of the pivot 188 in one direction and yieldingly holding and maintaining the pivoted lever 187 in "on"-position when thrown over center of the pivot 188 in the opposite direction as shown in Fig. 2. A rod 196 is rigidly secured to the pivotal lever 187. The rod 196 is provided with a slot 197 to receive the end 198 of a T-shaped rocker or fitting 199. A treadle lever 200 is connected at one end of the T-shaped rocker arm or lever and is operated by a treadle 201. When the operator presses upon the treadle 201 the lever 187 is pivoted over in close proximity to the sprocket wheel 141 directly in the path of the pin 202 which is secured to the sprocket wheel and the brake shaft is rocked when the pin 202 contacts with the end of the lever 187, actuating the brake mechanism to stop the feeder and at the same time releasing the frictional contact and pressure against the sheave pulley of the belt 35. A treadle lever 203 is attached to the rocker arm or lever 199 at the opposite end in spaced relation to the treadle lever 200 and is connected to a treadle 204. When the treadle 204 is actuated by the operator the pivotal lever 187 is swung to "off"-position as shown in full lines in Fig. 2 and the feeder is permitted to continuously operate as the brake is released and at the same time the belt 35 is tightened simultaneously therewith, by mechanism hereinafter described. A treadle lever 205 is attached at one end of the bracket 185 at one end and the opposite end is attached to a treadle 206 to provide for stopping the feeder in an emergency at any point of its operation. When the lever 205 is actuated it rocks the bracket 185 and the rock shaft 180 actuates the brake mechanism to brake and stop the feeder at any point of its operation.

The feeder can be stopped automatically at a predetermined point of its operation or at any point of its operation in an emergency or started by the manipulation of the treadles hereinbefore described and their associated mechanism to rock the brake shaft which actuates the following described mechanism.

A crank 207 is rigidly mounted on the brake shaft 180. A member 208 is provided having an arm 209 projecting therefrom in one direction and an arm 210 projecting at an angle from the arm 209 in the opposite direction. The arm 210 is constructed much larger, longer, and heavier than the arm 209. The member 208 is loosely mounted upon the power shaft 37 and is also supported by a bracket 210'. The arm 209 of the member 208 is pivotally connected to the crank 207 by a bifurcated connecting member 211 through the medium of the pin 212. The arm 209 is provided adjacent to its ends with a slot 213 and a pin 214 is adjustably secured thereto by a nut 215. The arm 210 is provided with a slot 216 and an idler pulley 217 is journaled on a pin 218 which is adjustably fastened to the arm 210 by a nut 219.

A brake band 220 is mounted in frictional contact with the brake pulley 38. One end of the brake band 220 is provided with a bracket 221 having an aperture formed therein and a groove 222. An L-shaped standard 223 is secured to the frame of the feeder and its upper end is pivotally secured to a bracket 224 which in turn is secured to the other end of the brake band 220. A bifurcated member 225 is pivotally attached to the L-shaped standard 223 and its upper end is screw threaded and passes through a slot formed in the bracket 221 and is adjustably held therein by the adjustable lock nuts 226. The arm 210 of the member 208 being heavier, longer, and larger than the arm 209 by gravity normally maintains the arm 208 in the position shown in Fig. 15. When the operator desires to start the feeder the treadle 204 is manipulated to swing the pivotal lever 187 to the position shown in full lines in Fig. 2, and the member 208 is then rocked by gravity to the position shown in Fig. 15 forcing the idler pulley 217 in contact with the belt 37 and simultaneously therewith releasing the pin 214 from its engagement with the notch 222 as shown in Fig. 15, thereby simultaneously releasing the brake mechanism and forcing the idler 217 in frictional contact with the belt 37 transmitting power to the feeder and operating same.

When it is desired to automatically stop the machine at a predetermined point the treadle 201 is actuated to throw the pivoted lever 187 to the dotted line position as shown in Fig. 2 in close proximity to the side of the sprocket gear 141 and in the path and in alignment with the pin 202 and by the contact therewith rocks the pivoted bracket 185 and brake shaft 180 which imparts movement to the brake crank 207 to actuate the arm 209 and forces the pin 214 to engage the notch 222 in the bracket 221 thereby actuating the brake bands to frictionally contact with the brake pulley 38 to stop the operation of the feeder and simultaneously therewith release the idler pulley 217 from its contact with the power transmission belt 35.

When it is desired to stop the operation of the feeder at any point of its operation the treadle 206 is actuated, imparting a rocking movement to the brake shaft 180 and bracket 185 transmitting movement to the crank 207, thence through its associated connecting mechanism to the arm 209 forcing the pin 214 to engage with the notch 222 and forcing the brake band in frictional contact with the brake wheel 38 and at the same time raising the idler pulley 217 from its pressure contact with the transmission belt 35, thereby stopping the brake mechanism at any point of its operation.

The bifurcated member 225, the threaded end of which passes through an aperture in the bracket 221 provides means of adjusting the bracket 221 through the medium of the lock nuts 226 to decrease or increase frictional contact of the brake band with the brake wheel 38.

It will be observed that the feeder is manually started or automatically stopped at the will of the operator through the medium of a unit mechanism, which is operated by different treadle connections thereto as described and set forth herein and shown in various sheets of drawings.

The motor 171 is preferably of the changeable speed type and is operated in the usual manner by changing or shifting the switches 235 and 236 to contact with different contacts as indicated by reference numerals 237 and 238. The operating cams rotate in a forward direction as indicated by the arrow in Figs. 11 and 13.

Attention is called to the fact that all of the vital operating elements of the device are inclosed either by tubular members or casings as for instance reference numeral 227 represents a housing that incloses the cams and actuators. Reference numeral 228 is a tubular mechanism inclosing the worm and worm gear. Reference numeral 229 represents tubular casings covering the cam that actuates the vacuum valve and the casing surrounding the vacuum valve. 230 represents tubular casings inclosing the power shaft 37 and the like. The idea and purpose being to inclose all parts of the mechanism so that they cannot be tampered with or put out of repair by dropping tools or the like into the moving parts thereof and perhaps breaking parts of the mechanism and further provides means for continuous oiling and greasing of the running parts of the feeder. To prevent a pile of sheets or other obstruction coming in contact with the suction cups a safety rod 231 is provided on one side of the machine normally depending downward to a point slightly above the truck containing the sheets of metal. The upper end of the safety rod 231 is pivotally connected by a pin 232 to one end of a long lever 233 which is keyed to the brake shaft 234. The safety rod 231 can be moved to a higher or lower position by rocking the brake shaft 180.

Attention is called to the fact that the mechanism for controlling the operation of the feeder can be applied without deviation or material changes to either the right or left side of the machine. The operating mechanism consisting of the cams and actuators can also be changed without deviating from the principle of the invention herein described and claimed. It will also be noted that the feeding mechanism can be supplied with one or more suction or vacuum cups without deviating from the principle of the invention herein described.

The operation of the above described mechanism to perform the objects herein set out is as follows: Movement is imparted to the feeder by transmitting power from the motor 33, to the power shaft 37 which through the worm and gear impart movement to the cam shaft 40. The cam shaft is provided with cams, which vary in size or contour. The size and contour of the cams being formed and arranged to impart the desired movement to the feeder mechanism through the medium of actuators 66 and 71 which are mounted on the rock shaft 44 and 45. The actuators are connected to means that carry the side frame bars 59 and are adapted to impart movement thereto according to the shape or contour of the cam faces or races.

The cams in the particular application referred to in the drawings and specification herein are adapted to impart movement to the frame and the suction or vacuum cups carried thereby, similar to that shown in Fig. 3 in the dotted line, which movement described briefly consists of lifting the suction cups vertical, then in a partial radius, and thence on a plane to the feeding and conveying rolls.

In Fig. 3 the suction cups are shown in contact with a pile of metal sheets, which is the normal position of the feeding mechanism. When movement is imparted to the feeding mechanism through the actuators and cams a vacuum is created in the suction cups by the vacuum producing apparatus 167, which is controlled to maintain or break the vacuum in the cups by a valve 158. When the vacuum is created in the cups and they are in a position and in contact with a pile of sheets as shown in Fig. 3 through the suction thereof the top sheet is gripped and held in close contact with the suction cups and as movement is imparted to the frame bars 59 the sheet of metal is carried and conveyed by the suction cups to a point between the friction feed roller and friction wheels to permit said means to carry and convey the sheet outside of the machine or to another machine associated therewith for further operation as shown in Fig. 3. When the suction cups carrying the sheets reaches the point where the sheet is delivered to the friction wheels and roller, the suction or vacuum is broken and the suction cups are returned to their normal position, preparatory to feeding another sheet of metal to the friction roller and wheels. This operation is repeated continuously until the entire pile is delivered one sheet at a time to the feeding roller and wheels or until the pile is delivered, or if desired the pile can be replenished from time to time before the entire pile is entirely fed to the rolls as herein described.

The suction cups being mounted yieldingly to yield conform to various heights of piles of sheet metal or the like so that the pressure on the piles is maintained yieldingly at all times irrespective of the difference in the heights of the piles. The suction cups as shown in Fig. 3 feed from the liquid pickling bath without any manipulation by hand or otherwise of the operator, hence no part of the anatomy is brought in contact with the acid bath, which is used for pickling purposes.

If it is desired for any purpose the feeder mechanism can be stopped at a predetermined point of its movement by the brake mechanism shown and described on an enlarged scale in Figs. 2, 3, 4, and 15. The same mechanism is used to stop the feeder mechanism at any point of its movement by the operation of the same mechanism. Means are also provided as described hereinbefore to start the feeder when desired. When a sheet is fed outside of the machine to associated mechanism such as a pair of oil rolls or the like and the sheet is fed to the rolls 137 before leaving the feed friction wheels and roller of the feeder, the speed of its travel is made to correspond with different lengths of sheets and is regulated by the friction clutch driving means of the feed wheels. In other words the feed friction wheels and roller are allowed to slip or be retarded so that in its speed of rotation will correspond with the feeding rotation of the rolls 137 or the like, thereby automatically forcing the friction speed wheels to conform with the speed of the rolls 137 or the like.

The drawings and description discloses the construction and operation of the feeder in its preferred application, that is, for feeding sheets from pickling vats or baths to a predetermined position outside of the feeder or to an auxiliary machine for further operation. The construction however can be changed or altered without deviating from the present construction without exercise of inventive faculty. The invention is not, therefore, intended to be confined or limited in its application for feeding any specific material from the feeder or to different auxiliary machines for further operation or confined for use for any particular art.

I claim:

1. In a feeder, a plurality of cams rigidly mounted on a driven shaft, rock shafts spaced from the driven shaft and journaled in parallel relation thereto, means journaled on the rock shafts and actuated by the cams to impart a partial rotary movement thereto, a movable frame, vacuum means mounted on the frame, means connected to the rock shafts and to the movable frame to impart in combination with the cams a predetermined movement to the frame, as set forth.

2. In a feeder, a plurality of cams rigidly mounted on a driven shaft, rock shafts spaced from the driven shaft and journaled in parallel relation thereto, means journaled on the rock shafts and actuated by the cams to impart a partial rotary movement thereto, a movable frame, vacuum means mounted on the frame, means connected to the rock shaft and to the movable frame to impart in combination with the cams a predetermined movement to the frame, and yieldable means to cushion the movable frame at the end of its stroke.

3. In a feeder, a plurality of cams rigidly mounted on a driven shaft, rock shafts spaced from the driven shaft and journaled in parallel relation thereto, means journaled on the rock shafts and actuated by the cams to impart a partial rotary movement thereto, a movable frame, vacuum means mounted on the frame, means connected to the rock shafts and to the movable frame to impart in combination with the cams a predetermined movement to the frame, means comprising one unit to automatically stop the feeder at a predetermined point of its operation, to stop the feeder at any point of its operation for emergency purposes and means to start the feeder.

4. In a feeder, a driven shaft, a plurality of cams of different forms mounted on said shaft, shafts located on each side of the driven shaft, means mounted on the shafts which are located on the side of the driven shaft adapted to rock the side shafts, swinging supporting arms journaled on the side shafts, a frame connected to said swinging supporting arms by a link mechanism which is reciprocated thereby, means connected to the link mechanism, and to the side rock shafts to raise and lower the frame associated with the reciprocating mechanism.

5. In a feeder, a driven shaft, a plurality of cams of different forms mounted on said shafts, shafts located on each side of the driven shaft, means mounted on the shafts which are located on the side of the driven shaft adapted to rock the side shafts, swinging supporting arms journaled on the side shafts, a frame connected to said swinging supporting arms by a link mechanism which is reciprocated thereby, vacuum means carried by the frame, means connected to the link mechanism, and to the side rock shafts to raise and lower the frame associated with the reciprocating mechanism.

6. In a feeder, a driven shaft, a plurality of cams of different forms mounted on said shafts, shafts located on each side of the driven shaft, means mounted on the shafts which are located on the side of the driven shaft adapted to rock the side shafts, swinging supporting arms journaled on the side shafts, a frame connected to said swinging supporting arms by a link mechanism which is reciprocated thereby, yieldable vacuum means carried by the frame, means connected to the link mechanism and to the side rock shaft to raise and lower the frame associated with the reciprocating mechanism.

7. In a feeder, a driven shaft, plurality of cams of different forms mounted on said shaft, shafts located on each side of the driven shaft, means mounted on the shafts located on each side of the driven shaft and which are actuated by the cams to rock the side shafts, swinging supporting arms journaled on the side shafts, a frame connected to said swinging supporting arms by a link mechanism which is reciprocated thereby, yieldable vacuum cups carried by the frame, means connected to the link mechanism, and to the side rock shafts to raise and lower the frame associated with the reciprocating mechanism and means to cushion the frame at each end of its stroke.

8. In a feeder, a driven shaft, a plurality of cams of different forms mounted on said shaft, rock shafts located on each side of the driven shaft, means mounted on the shafts which are located on the side of the driven shaft to actuate by the cams to rock the side shafts, swinging supporting arms journaled on the side shafts, a frame connected to said swinging supporting arms by a link mechanism which is reciprocated thereby, yieldable vacuum cups carried by the frame, means connected to the link mechanism and to the side rock shaft to raise and lower the frame associated with the reciprocating mechanism, means to cushion and balance the frame at each end of its stroke means to stop the feeder manually and automatically and means to start the feeder.

9. In a sheet feeder actuated by a power belt in combination with an idler, a movable frame, means adapted to raise and lower said frame and adapted also to reciprocate said frame in a longitudinal direction, suction means mounted on said frame and an emergency brake mechanism adapted to cooperate with the idler to stop the feeder at any point of its operation.

10. In a sheet metal feeder actuated by a power belt in combination with an idler, a movable frame, means adapted to raise and lower said frame combined and also adapted to reciprocate said frame in a longitudinal direction, suction means mounted on said frame, and an emergency brake mechanism associated with said feeder and adapted to stop the feeder at a predetermined point of its operation.

11. In a sheet metal feeder actuated by a power belt in combination with an idler, a movable frame, means adapted to raise and lower said frame, associated means adapted to reciprocate said frame in a longitudinal direction, suction means mounted on said frame, an emergency brake mechanism associated with said feeder mechanism, and adapted to be operated to stop the feeder at any point of its operation and starting means associated with the brake mechanism adapted to be operated to increase the pressure of the idler on the power belt of the feeder and simultaneously therewith release the brake mechanism.

12. In a sheet metal feeder operated by a power belt in combination with an idler, a movable frame, means adapted to raise and lower said frame combined with means adapted to reciprocate said frame in a longitudinal direction, suction means mounted on said frame, emergency brake mechanism associated with the feeder adapted to be operated to stop the feeder at any point of its operation, starting means associated with the brake mechanism adapted to be operated to increase the pressure of the idler on the power belt of the feeder and simultaneously therewith release the associated brake mechanism and means to automatically operate the brake mechanism at a predetermined point of the operation of the feeder.

13. In a sheet metal feeder operated by a power belt in combination with an idler, a movable frame, means adapted to raise and lower said frame, means adapted to reciprocate said frame in a longitudinal direction, suction means mounted on said frame, an emergency brake mechanism associated with the feeder and adapted to be operated to stop the feeder at any point of its operation, starting means associated with the brake mechanism adapted to be operated to increase the pressure of the idler on the power belt of the feeder and simultaneously therewith release the brake mechanism and means combined with the brake and stop means to automatically release the brake mechanism and simultaneously therewith relieve the pressure of the idler exerted on the power belt to stop the feeder at a predetermined point of its operation.

14. In a sheet metal feeder, a movable frame, means to impart a combined vertical and horizontal reciprocating movement in a longitudinal direction to the movable frame, vacuum means mounted on the frame, a unitary mechanism comprising automatic means for stopping the feeder at a predetermined point of its operation, means to start the feeder and manually operable means to stop the feeder at any point of its operation.

15. In a sheet metal feeder, a movable frame, means to impart a combined vertical and horizontal reciprocating movement in a longitudinal direction to the movable frame, vacuum means mounted on the frame, a brake mechanism comprising in one unit, automatic means for stopping the feeder at a predetermined point of its operation, means to start the feeder and manually operable means to stop the feeder at any point of its operation, in combination with yieldable means to cushion the impact of the movable frame at each end of its stroke and thereby store energy in the yieldable means to give impetus to start the movable frame on its return stroke.

16. In a sheet metal feeder, a movable frame, suction means mounted on the frame, means to impart a combined vertical, radial and horizontal reciprocating movement in a longitudinal direction to the movable frame in combination with means to start and stop the feeder manually or automatically at any point of its operation.

17. In a machine of the character described in combination, a movable frame, suction means associated therewith, means adapted to actuate the frame in a longitudinal direction, suction means mounted on the frame to feed a sheet of metal to a predetermined place in combination with a unit brake mechanism adapted to manually or automatically control the operation of the machine at the will of the operator.

18. In a machine of the character described in combination, a movable frame, means adapted to actuate the frame in a longitudinal direction, suction means mounted on the movable frame to feed a sheet of metal to a predetermined place in combination with a brake mechanism for manually or automatically stopping the operation of the machine and also having associated therewith means to start the feeder.

19. In a feeder of the character described in combination, a movable frame, means adapted to actuate the frame in a longitudinal direction, suction means mounted on a movable frame to contact with and feed a sheet of metal to a predetermined place in a longitudinal direction and conveying means associated with the feeder driven by a cooperating friction clutch which is adapted to grip the sheet and deliver same outside the machine.

20. A feeder for sheet metal, comprising in combination a movable frame, vacuum means carried by the frame, means for simultaneously imparting a combined reciprocating and vertical movement to the frame in a longitudinal direction, means to create a vacuum and break the vacuum at a predetermined point of the operation of the movable frame, combined with a unit controlled mechanism adapted to be operated to manually stop and start the feeder as described.

21. A feeder for sheet metal, comprising in combination a movable frame, a vacuum means carried by the frame, means of simultaneously imparting a combined reciprocating and vertical movement to the frame in a longitudinal direction, and means to create a vacuum on the frame and break said vacuum at predetermined points of the movement of the movable frame, combined with cooperating means to automatically stop the feeder at predetermined points of its movement.

22. The combination in a feeder for feeding sheet metal, comprising a series of cams, actuators operated by said cams in opposed relation to each other, a feeding mechanism operated by said actuators, a frame movable in a longitudinal direction, vacuum means adapted to contact with a pile of sheets carried by the frame and by suction grip, carry and deliver a single sheet of metal on a plane to a predetermined point the feeder being operated in cooperation by a unit control mechanism for stopping and starting the feeder.

23. In a feeder for lifting and feeding sheet metal in a longitudinal direction in combination with a control mechanism for controlling the operation of the feeder comprising a unit mechanism operable in association with the feeder to manually stop and start the feeder and also operable to automatically stop the feeder at a predetermined point of its operation.

24. In a feeder for sheet metal, a movable frame, means to impart irregular movement thereto in a longitudinal direction, suction means carried by the movable frame, a unit control mechanism for controlling the operation of the feeder associated with the feeder and operated by a plurality of treadles arranged to operate in proximity to each other to permit control thereof by the operator without changing his position.

25. In a feeder for sheet metal, means for creating a suction on a sheet of metal and for breaking and producing a suction at predetermined times, means for delivering a sheet of metal from and to a predetermined place in a longitudinal direction combined with a unit mechanism comprising means of manually stopping and starting the feeder and also including automatic means for stopping the feeder at a predetermined point of its operation as described and set forth.

26. In a feeder for sheet metal, the combination of a feeding mechanism with vacuum producing means associated therewith, means to make and break the vacuum and an associated unit mechanism operable by a treadle mechanism to manually stop and start the feeder at any point of its operation and also providing means to automatically stop the feeder mechanism at a predetermined point of its operation.

27. In a machine of the character described for feeding sheet metal in combination a movable frame, means to impart a variable movement to the frame, a vacuum producing apparatus associated with the movable frame, means associated with the vacuum producing apparatus to create a vacuum at a predetermined time and to break the vacuum at a predetermined time, whereby a single sheet of metal at a time is carried by the movable frame from one location to another and deposited and a combined unit mechanism comprising manual means to stop and start the feeder at any point of its operation and also providing means for stopping the feeder at a predetermined point.

28. In a machine of the character described for feeding sheet metal in combination a movable frame with means to impart a variable movement to the frame, a vacuum producing apparatus associated with the movable frame, means associated with the vacuum producing apparatus to create a vacuum at a predetermined time and to break the vacuum at a predetermined time, whereby a single sheet of metal at a time is carried by the movable frame from one location to another for delivery, a combined and associated unit mechanism comprising manual means to stop and start the feeder at any point of its operation, which also provides means for stopping the feeder at a predetermined point and means to cushion its throw at one end of the stroke and to balance the throw at the other end of its stroke.

29. In a feeder for sheet metal, a movable frame, suction means mounted on the frame, means to impart a combined vertical, radial and horizontal reciprocating movement to the movable frame, means combined with the above described means to start and stop the feeder manually, and means to automatically stop the feeder at any point of its operation.

30. The combination of a feeder for feeding sheet metal, comprising a series of cams mounted in opposite relation to each other, actuators mounted in opposite relation to each other operated by said cams, a feeding mechanism operated by said actuators, a movable frame carried by the feeding mechanism, vacuum means adapted to contact with a pile of sheets carried by said frame and by suction grip and deliver a single sheet of metal on a horizontal plane to a predetermined point and means to break the vacuum at a predetermined point of the travel of the feeder.

31. In a feeder for sheet metal, means for creating a suction on a sheet of metal and breaking the suction at predetermined times, means for delivering in a horizontal plane a sheet of metal from and to a predetermined place and means to balance the throw of the feeding mechanism at the end of its stroke and store energy for the return stroke of the delivery mechanism.

32. In a feeder for sheet material, in combination a series of shafts having a plurality of cams mounted thereon in opposed relation to each other, a movable frame, means connected to the frame and operated by the cams to impart a reciprocating plane movement to the frame and raise and lower same, said operating mechanism for the frame being cushioned at each end of its throw.

33. In a feeder for sheet material, in combination a series of shafts having a plurality of cams mounted thereon in opposed relation to each other, a movable frame, means connected to the frame and operated by the cams to impart a reciprocating movement to the frame and raise and lower the same, said operating mechanism of the frame being cushioned at each end of its throw, vacuum cups carried by the frame and means to continue or cut off the vacuum at predetermined points of the throw of said movable frame, means associated with the above described mechanism, whereby the sheet is fed from the feeder to another appropriate machine for further work.

34. In a feeder for sheet metal, the combination of a series of shafts arranged in spaced apart and parallel relation to each other, bell shaped cranks mounted thereon, a movable frame, means to connect the movable frame and bell shaped cranks, cams to actuate and impart movement to the movable frame in a combined vertical and horizontal direction, suction means carried by said frame, whereby a vacuum is created and broken at a predetermined point in the reciprocating movement of the movable frame, a brake mechanism associated therewith whereby the operation of said machine can be stopped and an idler associated with the brake mechanism to frictionally contact with the belt of the power transmitting member, as and for the purpose described.

35. In a feeder for sheet metal, in combination a series of shafts, a plurality of cams mounted on the shafts in opposed relation to each other, a movable frame, means connected to the movable frame that is actuated by said cams, a vacuum means carried by said frame, means to regulate the yielding contact of said means, a valve mechanism arranged to be operated at predetermined times to exert a suction upon the material and break or make such suction as and for the purpose described.

36. In a feeder, a movable frame, means to actuate said movable frame to reciprocate in a combined vertical radial and horizontal direction on a plane, and means operable from either side of the feeder to stop or start said feeder at a predetermined point.

37. In a feeder, a movable frame, means to actuate said frame to reciprocate in a combined vertical and horizontal direction, means operable from either side of the feeder to stop or start said feeder at a predetermined point and to permit said feeder to operate, a yielding vacuum means provided on said movable frame and means adapted to create a suction and cut off said suction at predetermined points in the movement of the movable frame.

38. In a feeder, a feeding mechanism, means to impart in sequence a vertical, radial and horizontal reciprocating movement to the feeding mechanism, means mounted on the feeding mechanism to create a vacuum at a predetermined point in the movement of the feeding mechanism, means to break the vacuum at a predetermined time and means to receive and convey sheets of metal of different lengths, said last mentioned means being automatically retarded when sheets of different lengths are gripped by another feeding means which provides unison movement for both feeding means.

39. In a feeder, a feeding mechanism, means to impart in sequence a vertical, radial and horizontal reciprocating movement to the feeding mechanism, a vacuum producing apparatus connected to the feeding mechanism, means to produce a vacuum upon a sheet of metal at a predetermined time and break the vacuum at a predetermined time, auxiliary means to convey said sheet away from the feeder, said auxiliary means being so arranged, adapted and constructed to convey a sheet of metal to another machine for operation thereon and also to be automatically retarded to correspond with the speed of the other machine.

40. The combination of a feeder for sheet metal comprising a rectangular movable frame having cups mounted thereon at each corner, means to reciprocate said movable frame in a combined vertical and horizontal direction and means to cushion the throw of said frame at the end of the stroke, means to produce a vacuum in the cups and means to break the vacuum in the cups at predetermined times.

41. The combination of a feeder for sheet metal comprising a rectangular movable frame having a cup mounted at each corner, means to reciprocate said movable frame in a vertical and horizontal direction in sequence, means to cushion the throw of said frame, a suction producing apparatus, a suction means on the frame, means to connect the suction apparatus to the frame, means to permit and cut off said suction at predetermined times, the suction means and means to reciprocate the frame being so constructed as to yield when brought in contact with the material that is being fed, irrespective of variation in the height of the pile of metal.

In testimony whereof I affix my signature.

WILLIAM W. LEACH.